April 7, 1964     K. A. SWANSTROM     3,127,919
SCREW WITH CAVITY HEAD
Filed May 6, 1959                                      2 Sheets-Sheet 1
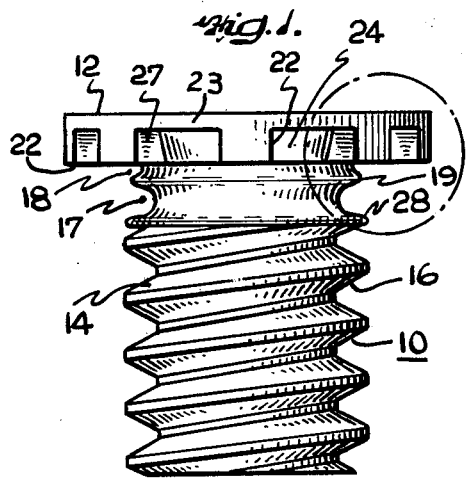
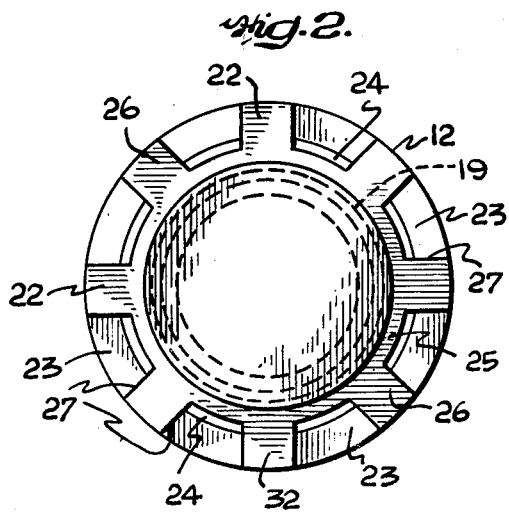
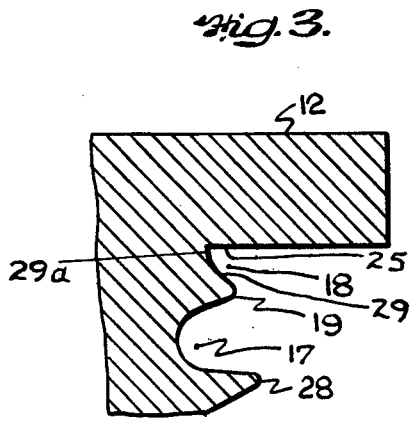
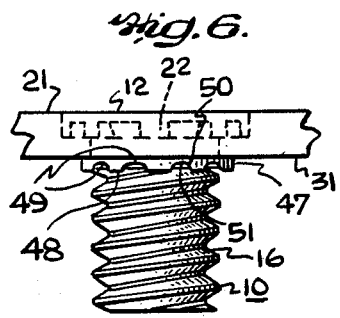
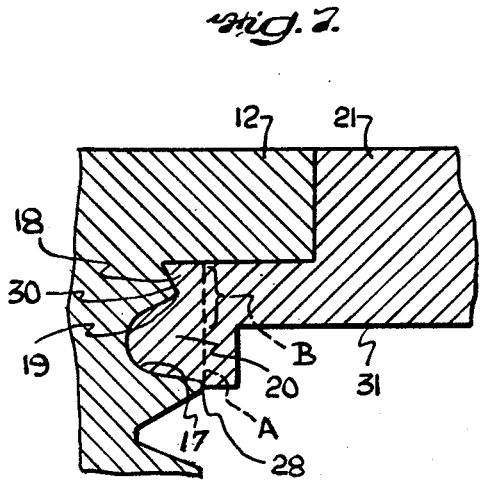
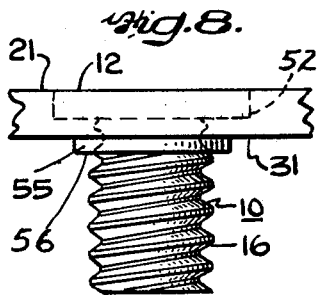
INVENTOR.
KLAS ARENT SWANSTROM
BY
HIS ATTORNEY

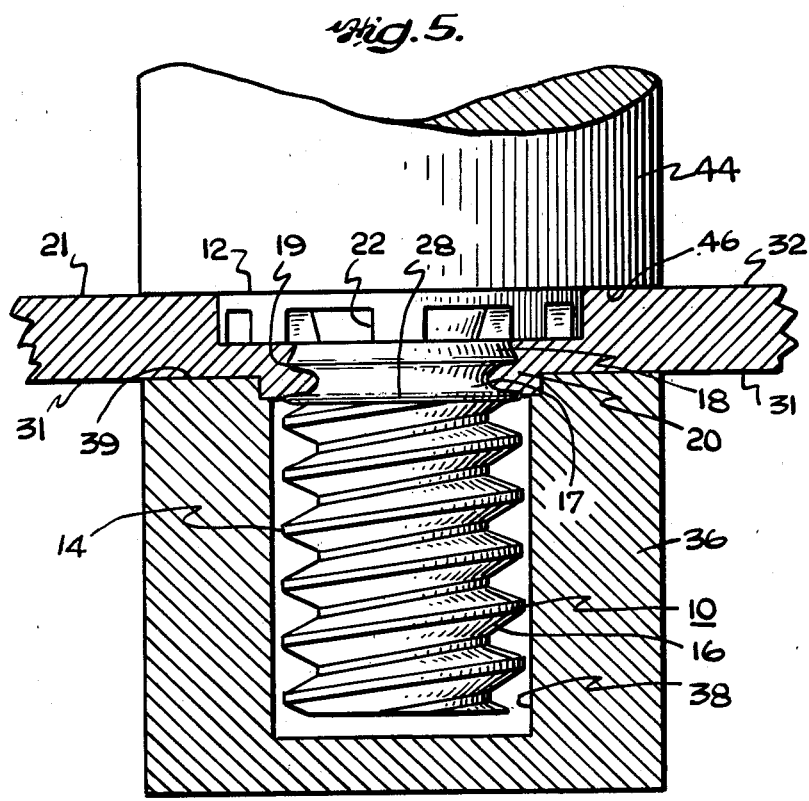
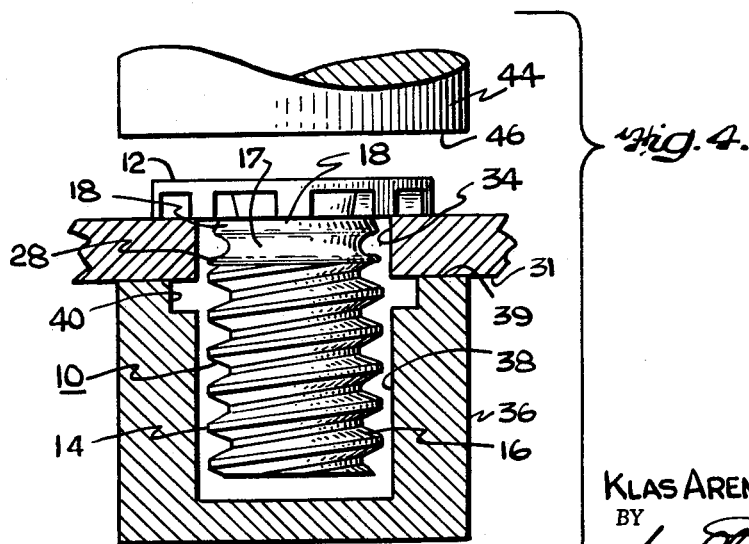
INVENTOR.
KLAS ARENT SWANSTROM
BY
HIS ATTORNEY

United States Patent Office 3,127,919
Patented Apr. 7, 1964

3,127,919
SCREW WITH CAVITY HEAD
Klas Arent Swanstrom, Doylestown, Pa., assignor to Penn Engineering & Manufacturing Corporation, Doylestown, Pa., a corporation of Pennsylvania
Filed May 6, 1959, Ser. No. 811,495
9 Claims. (Cl. 151—41.73)

My invention is an improved self-clinching, headed stud and a method of securing same to thin sheeted material. Such stud provides permanent fastening means by which other components may be secured to the sheet or panel by a nut or fastener threaded on to the end of the stud.

The construction of my improved stud is particularly adapted for use in comparatively soft panels, such as cold rolled steel, brass, copper, and aluminum alloys, and which are relatively thin, i.e., 1/16 of an inch or less, but may be used with relatively hard materials, such as stainless steel, which are in thin, sheeted form. The joinder between the stud and the sheeted material produces a flush head assembly which securely locks the stud into the sheeted material and results in high torque and push-out resistance.

It is recognized that the problem of securing bolts or studs to thin sheeted material presents special problems due to the thinness, and frequently softness, of the material with resulting ease of pull out or turning of the stud when a fastener is being secured to the projecting end of the stud. Previous efforts to secure a stud to a thin, sheeted material have frequently resulted in the buckling of the material in the vicinity of the head of the stud at the time the head is driven into the sheeted material.

An object of my invention is to provide a headed stud permitting a flush head assembly wtih a sheeted material or panel so that the head is securely locked in the sheet.

A further object of my invention is to provide quick and easy means for securing the headed end of the stud in the sheeted material.

It is a still further object of my invention to provide a headed stud which can be locked in a sheeted material without buckling of the material in the vicinity of the stud head when the head is driven into the sheeted material.

A still further object of my invention is to provide a stud that can be secured to sheeted material with high torque and push-out resistance.

My improved self-clinching, headed stud comprises a head and an integral shank, the latter having a portion spaced from the head that is threaded to receive a fastener member. Between threaded portion of the shank and the head there are provided a pair of annular recesses one of which is designed to straddle and grip the under surface of the sheeted material. The head is preferably provided with spaced prongs on its under side which reach down to but not beyond the annular recesses on the stud.

The sheeted material to which the stud is to be secured is provided with a hole large enough to slidably receive the threaded portion of the stud. When the stud is dropped into the hole the head of the stud rests upon the upper surface of the sheeted material. An anvil having a central bore for receiving the threaded end of the stud is placed on the under side of the sheet so as to embrace the projecting portion of the stud. The anvil is also provided with an annular groove communicating with the central bore. When the anvil has been properly located and the stud has been inserted in the hole of the sheeted material, a punch is used to drive or squeeze the head of the stud into the sheeted material until the top of the head is flush with the top surface of the sheet. The punching or squeezing action securely imbeds the head in the sheet and causes the material displaced by the head to flow into the annular recess and into the annular groove in the anvil thereby creating a flush head assembly having such resistance to movement in both radial or longitudinal directions as to usually require rupture of the sheet in order to move the stud.

The principles of my invention and the best mode in which I have contemplated applying such principles will further appear from the following description and the accompanying drawings in illustration thereof.

FIG. 1 is a side elevational view of the headed stud incorporating my invention;

FIG. 2 is a bottom view of the stud illustrated in FIG. 1;

FIG. 3 is an enlarged fragmentary cross-sectional view of the portion of FIG. 1 that is encircled;

FIG. 4 is a view, partly in cross-section and partly in elevation, illustrating a stud constructed in accordance with my invention and located within a hole of sheeted material but prior to its being secured thereto and illustrating also the anvil and punch utilized in the securing operation;

FIG. 5 is a view similar to FIG. 4, showing the stud after it has been secured to the sheeted material;

FIG. 6 is a side elevational view of the stud and sheeted material after the anvil and punch have been removed;

FIG. 7 is an enlarged, cross-sectional view similar to FIG. 3 but illustrating a modified stud after it has been secured to the sheeted material; and FIG. 8 is a side elevational view, similar to FIG. 6, but illustrating a stud with a modified head and resulting annular ring.

Referring to the drawings, FIG. 1 illustrates a self-clinching stud 10 having a head 12 and a depending integral shank 14, the major portion of the shank 14 being provided with threads 16 adapted to receive a fastener. Between the threads 16 and the head 12 are provided two annular undercut recesses or cavities 17, and 18, separated from each other by a crest 19, which receive displaced material 20 (FIG. 5) that flows when the stud 10 is permanently secured to a thin sheeted member 21.

The head 12 preferably includes spaced integral prongs 22 depending from the underside of a rim 23 on the head 12. The prongs 22 serve to increase the resistance of the stud to torque forces when the stud is secured to the sheeted member 21. The prongs 22 are arranged in an annular array extending radially outwardly (FIG. 2) from a conical central portion 24 of the head 12 that converges downwardly and that includes a flat annular ring 25. The prongs have flat bottom surfaces 26 (that are substantially coplanar with the flat ring 25) and vertical flat and approximately radial parallel side walls 27.

The first or lower annular recess 17 is defined by a wall approximately semi-circular or C shape in cross section, as illustrated by FIG. 3, and has a volume larger than the volume of the voids between adjacent threads 16 or the recess 18. The crest 28, between the recess 17 and the threads 16, has a diameter approximately equal to the maximum diameter of the threads 16. The minimum diameter of the recess 17 is approximately equal to the root diameter of the threads. The height of the recess 17 is greater than the height of the voids between adjacent threads 16. The crest 19, between the recesses 17 and 18, has a maximum diameter less than the maximum diameter of the threads 16.

The second or upper recess 18 is defined by an inclined or curved wall 29 and the ring 25, as illustrated in FIG. 3. The minimum diameter of the recess 18 is located at the juncture of the curved wall 29 and the ring 25 and is approximately equal to the pitch diameter of the threads 16. The exact shape of the wall 29 may vary slightly, that is to say, it may include a substantially vertical upper portion 29a, as illustrated in FIG. 3, or comprise an entirely inclined wall 30, as illustrated in FIG. 7.

As illustrated in FIG. 5, the recesses 17 and 18 are proportioned and arranged relative to each other and the sheet metal plate 21 so that a substantial portion of the axial width of the recess 17 will lie partially below the lower surface 31 of the sheet 21 after the stud is secured to the sheet with the upper surface of the head 12 flush with the upper surface 32 of the sheet metal plate.

As viewed in FIG. 4, the stud is secured to the sheet 21 by first inserting the shank 14 through the hole 34 in the sheet 21. An anvil 36, provided with a central bore 38 for receiving the threaded portion 16 of the stud, is then positioned so that its face or upper surface 39 contacts the lower surface 31 of the sheet metal plate and is held in this position against movement by any suitable means. The anvil 36 is provided with an annular, square shouldered groove 40 communicating with the central bore 38, hole 34 and the face 39.

The vertical dimension of the groove 40 is such that, as illustrated in FIG. 5, after the head 12 is driven flush with the upper surface 32, the groove 40 encompasses a portion of the annular recess 17 but substantially none of the shank below the lower recess 17, that is substantially none of the threads 16 are encompassed thereby.

Above the head 12 is positioned a suitable punch 44 which is driven downwardly by any suitable mechanism, the latter being well known and does not form part of this invention. The punch 44 has a face 46 that is larger than the size of the head 12 so that the punch face 46 overlaps the portion of the sheet metal plate encompassing the stud head. Preferably, the face 46 is equal in size to the face 39 of the anvil 36.

When the punch 44 is driven downwardly it in turn drives the head 12 into the sheet 21 countersinking it flush with the top surface 32 of the sheet. This action forces the material of the plate 21 beneath the head 12 to flow downwardly and radially inwardly thereby completely filling the annular recess 18 and filling, or substantially so, the recess 17. That is to say, the sheet material 20 below the prongs 22 and the rim 23 is forced to flow primarily downwardly into the recesses and, to a lesser degree, annularly about the recesses. The small outside diameter of the crest 19, as compared with that of the crest 28, provides no impediment to the downward flow of displaced material. However, the crest 28 and bottom of the groove 40 does limit the downward flow of material and causes the material displaced by the prongs 22 to flow annularly about the groove 40 and recess 17 resulting in an annular boss 47 below the surface 31 of the sheet 21.

The volume of the recesses 17 and 18 above the lower surface 31 is less than the volume of material displaced by the prongs 22, the ring 25, and the rim 23. Likewise, the volume of that portion of the groove 40 that receives the flowing material is smaller than that of the material below the prongs 22 that is forced to flow downwardly below the surface 31. Thus, the material that flows past the surface 31 in excess of the volume of the groove 40 directly below each prong 22 is forced by the walls defining the groove 40 to flow radially inwardly toward the shank 14 entering the recess 17 at spaced intervals about the periphery thereof and tightly engaging the shank, as illustrated in FIGS. 5 and 7.

Thus, after the anvil 36 has been removed, one sees (FIG. 6) below the surface 31 an irregular annular boss or bead 47 formed by a plurality of pods 48 disposed approximately below each of the prongs 22 and gaps 49 between the pods 48. The flowing material completely fills all of the recess 18 and all of the recess 17 above the lower surface 31. The pods 48 are interconnected by a ring 50, having portions including a lower looped surface 51 bowed upwardly between adjacent pods.

The depth of the interconnecting ring 50 depends upon the spacing between the prongs 22. If the prongs are spaced very close to each other the pods 48 will be, of course, closer to each other, the length of the ring 50 between pods 48 will be shorter than that illustrated in FIG. 6, and less of the recess 18 below the lower surface 31 of the sheet metal plate will be gaped. The reverse will be true if the prongs are spaced far apart from each other.

The ring and pod connection between the stud and the sheet is such as to offer very substantial resistance to forces generally parallel to the longitudinal axis of the bolt (tending to separate the bolt from the sheet metal plate) by increasing the shear area along which the force is applied. Thus, referring to FIG. 7, it is seen that by reason of the annular boss 47 the shear area is represented by the dotted line which is much greater in extent than the shear area B, which extends from the bottom of the prong 22 to the surface 31. The B area would be the extent of the shear area if the recess 17 were terminated at the surface 31. By utilizing the foregoing proportions and a C shape providing a root that is large in comparison to the root of the threads, the locked material that holds the stud to the sheet 21 is substantially in excess of that which would engage the shank if the threads were continued all the way up the shank. Such large mass of connecting or locked material provides a strong and secure connection between the sheet metal member and the stud as well as presenting a substantially transverse surface connection to any shearing force rather than an inclined surface connection, as in the case of a threaded connection.

Likewise, since the crest 19 of my stud is of a smaller diameter than the major diameter of the threads and since the hole into which the stud is placed is preferably made as small as possible, a space is provided between the crest 19 and the sheet 21 through which the flowing material may pass during the driving in of the head. Such space would not exist if the threads extended to the stud head since all the threads would have the same diameter. Such spacing is believed to be the reason that my stud does not buckle the sheet material, heretofore frequently found about clinch bolts of this type.

FIG. 8 illustrates a modification in which the spaced prongs 22 have been replaced by a solid member 52 equivalent to prongs without any spaces therebetween. In this embodiment, when the head 12 is driven into the sheet 21, the head 12 forces the sheet material emcompassing the shank to flow downwardly. This annular ring of flowing material is guided inwardly by the walls of the groove 40 to form a ring 55 depending from the lower surface 31 which has the same depth throughout its periphery. Thus, in this embodiment the annular recess 17 becomes completely filled down to the lower surface 56 of the ring 55.

The shape of the head 12 may be that of a square, oval or hexagon rather than the round shape shown, if desired.

Having described my invention, I claim:

1. In combination, a sheeted material having first and second surfaces and a hole therethrough, a stud including a head and a shank, said shank extending through said hole, said shank having a threaded portion spaced from said head, said shank having first and second undercut recesses between said threaded portion and said head, said first recess being closer to said threads than said second recess, said head being driven into said sheet flush with said first surface, a portion of the material of said sheet adjacent said stud being forced by said head to flow into said second recess and toward said first recess, the volume of said first recess being larger than the volume of said second recess, and an annular bead formed by the flowing material extending into said first recess and projecting from said second surface.

2. In combination, a sheeted material having top and bottom surfaces and a hole therethrough, a stud including a head and a shank, said shank extending through said hole, said shank having a threaded portion spaced from said head, said shank having first and second undercut annular recesses between said threaded portion and said head, said first recess being closer to said threads than said second recess, said head being driven into said sheet flush with the top surface thereof, a portion of the material of said sheet encompassing said stud being displaced and forced by said head to flow downwardly and radially inwardly toward said recesses, the volume of said first recess being larger than the volume of said second recess, and an annular bead encompassing and extending into a portion of said first recess and formed by said flowing material, said bead depending from the bottom surface of said sheet metal body, and said bead filling at least a portion of the first recess.

3. The structure recited in claim 2 wherein the volume of said recesses between the top and bottom surfaces of said sheet is less than the volume of the displaced material of said sheet.

4. A self-locking and countersinking stud including a head and a shank, said shank including a threaded portion and an unthreaded portion, the unthreaded portion being between the threaded portion and the head, said unthreaded portion being formed with two annular undercut recesses, the recess closest to the threaded portion being of larger volume than the other recess, a first crest separating said recesses, said first crest having an outside diameter smaller than the outside diameter of said threads, a second crest separating the recess of larger volume from the threads, said second crest having substantially the same outside diameter as the threads, the head displacing a volume of sheet metal material larger than the volume of the smaller of the recesses, whereby when said stud is driven into a sheet metal plate, the buckling of the plate is minimized due to the flow of displaced material in excess of the volume of the smaller recess into the larger recess after the first recess is filled.

5. The method of securing a stud including a head having depending prongs and a shank having undercut annular recesses adjacent said head to a sheet member having top and bottom surfaces comprising proportioning the recesses so that the lowest one straddles the bottom surface of said sheet member after said stud is secured to said sheet member, providing said sheet member with a bore for slidably receiving said shank, placing said stud in said bore with its head in contact with the top surface of said sheet member, providing an anvil with a central opening for receiving said shank and an annular groove communicating with said central opening and encompassing a portion of the lowest recess below the bottom surface of said sheet member after said stud is secured to said sheet member, placing said anvil in abutment with the bottom surface of the sheet member with said annular groove in communication with said bore in said sheet member, securing the anvil to resist a force to drive the head into the sheet member, and driving said head into said sheet member until it is flush with the top surface of the sheet member by use of a punch for securing said stud to said sheet member, said driving of the head into the sheet member causing the head to force a portion of the sheet material having a volume in excess of the volume of the recesses ultimately disposed between the top and bottom surfaces of the sheet member adjacent the stud to flow toward said recesses and groove, and said lowest recess becoming partially filled while said uppermost recess becomes entirely filled.

6. The method of securing a stud including a head having depending spaced prongs and a shank having two undercut annular recesses adjacent said head to a sheet member having top and bottom surfaces comprising proportioning the recesses so that the lower one straddles the bottom surface of said sheet member after said stud is secured thereto, providing said sheet member with a bore for slidably receiving said shank, placing said stud in said bore with its head in contact with the top surface of said sheet member, providing an anvil with a central opening for receiving said shank and an annular groove communicating with said central opening and encompassing a portion of the stud extending beyond the bottom surface of said sheet member, placing said anvil in abutment with the bottom surface of the sheet member, securing the anvil to resist a force to drive the head into the sheet member, and driving said head into said sheet member until it is flush with the top surface of the sheet member by use of a punch for securing said stud to said sheet member, said driving of the head into the sheet member causing the head to force a portion of the sheet member in excess of the volume of said recesses and adjacent the stud to flow toward said recesses and groove, the upper recess becoming filled with sheet material and tightly engaged thereby, the lower recess becoming partially filled with an irregular annular bead, the irregularities being spaced from each other approximately the same distance as the spacing between said prongs.

7. A self-locking and countersinking stud including a head and a shank, said shank being divided into an undercut portion and a fastener means, the undercut portion being between the fastener means and the head, said undercut portion being formed with two annular undercut recesses, the recess closest to the fastener means being of larger volume than the other recess, a first crest separating said recesses, said first crest having an outside diameter smaller than the outside diameter of said fastener means, a second crest separating the recess of larger volume from the fastener means, said second crest having substantially the same outside diameter as the fastener means, the head displacing a volume of sheet metal material larger than the volume of the smaller of the recesses, whereby when said stud is driven into a sheet metal plate, the buckling of the plate is minimized due to the flow of displaced material in excess of the volume of the smaller recess into the larger recess after the first recess is filled.

8. In combination, a sheeted body having top and bottom surfaces and a bore therethrough, a drive-type fastener including a head and a shank, said head being driven into said sheeted body flush with one of said surfaces and displacing a portion of said sheeted body, said shank including fastener means spaced from said head, said shank also including two annular recesses formed in said shank between said fastener means and said head to accept material displaced only by said head, the recess spaced farthest from said head having a volume larger than the other recess and straddling one of said surfaces of said sheeted body, a crest separating the two recesses from each other, and a second crest separating the recesses from the fastener means, said first crest having a smaller outside diameter than said second crest, said second crest having a smaller outside diameter than the bore in said sheeted body, said head having a size and being driven into said sheeted body to such an extent relative to the volume of the recess closest to the head as to displace a volume of material in excess of the volume of the recess closest to the head, whereby the displacement of the sheeted body material is accomplished only by said head and not by either one of said crests when said head is driven into said sheeted body and a volume of sheeted body material is displaced in excess of the volume of the recess closest to the head and the excess material entering the recess farthest from the head.

9. The method of securing a stud including a head and a shank having undercut annular recesses adjacent said head to a sheet member having top and bottom surfaces comprising providing said sheet member with a bore for slidably receiving said shank, placing said stud in said bore with its head in contact with the top surface of said sheet member, providing an anvil with a central opening for receiving said shank and an annular groove communicating with said central opening for encompassing a portion of said shank below the bottom surface of said sheet metal member, placing said anvil in abutment with the bottom surface of the sheet member with said annular groove in communication with said bore in said sheet member, securing the anvil to resist a force to drive the head into the sheet member, and driving said head into said sheet member until it is flush with the top surface of the sheet member by use of a punch and the lower annular recess straddles the lower surface of said sheet member, said head displacing toward the recesses during said driving a portion of the sheet member adjacent the stud in excess of the volume of the recess closest to the head to fill the latter with some of the displaced material and the remainder flowing into the farther recess and groove to minimize buckling of the sheet member upon the driving of the head into the sheet member for securing said stud to said sheet member.

References Cited in the file of this patent

UNITED STATES PATENTS

| | | |
|---|---|---|
| 1,919,552 | Hasselquist | July 25, 1933 |
| 2,078,212 | Leighton | Apr. 20, 1937 |
| 2,358,728 | Miller | Sept. 19, 1944 |
| 2,486,769 | Watson | Nov. 1, 1949 |
| 2,913,820 | Barth | Nov. 24, 1959 |

FOREIGN PATENTS

| | | |
|---|---|---|
| 500,583 | Canada | Mar. 16, 1954 |